April 12, 1949.  R. M. WILSON  2,467,066
ADJUSTABLE RACK SLIDE BEARING
Filed Feb. 27, 1947  2 Sheets-Sheet 1
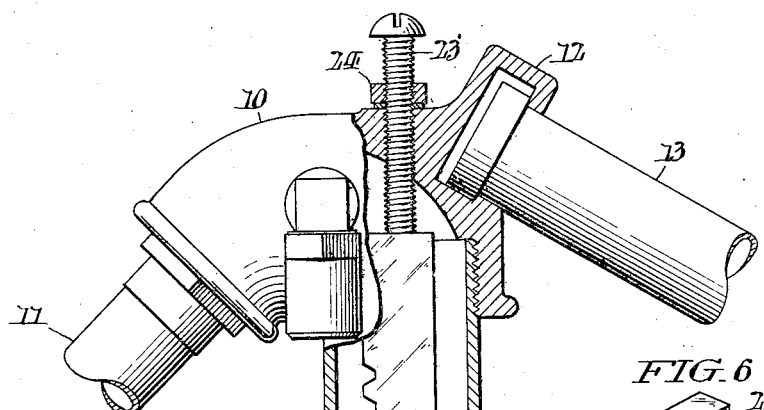
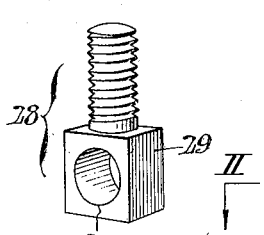
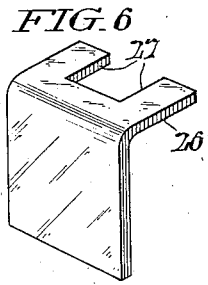
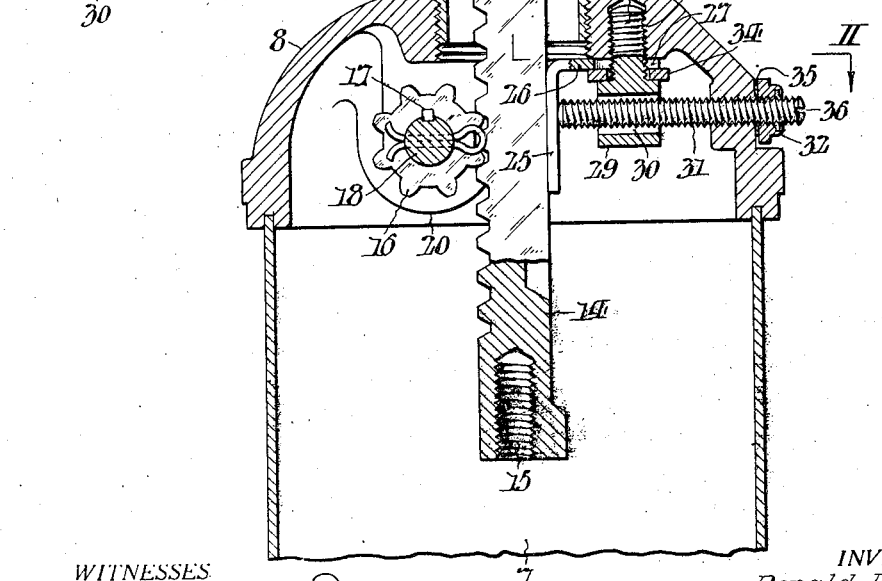
WITNESSES
Thomas W. Kerr, Jr.
A. J. Brittingham
INVENTOR:
Ronald M. Wilson,
BY Paul & Paul
ATTORNEYS.

April 12, 1949. R. M. WILSON 2,467,066
ADJUSTABLE RACK SLIDE BEARING
Filed Feb. 27, 1947 2 Sheets-Sheet 2
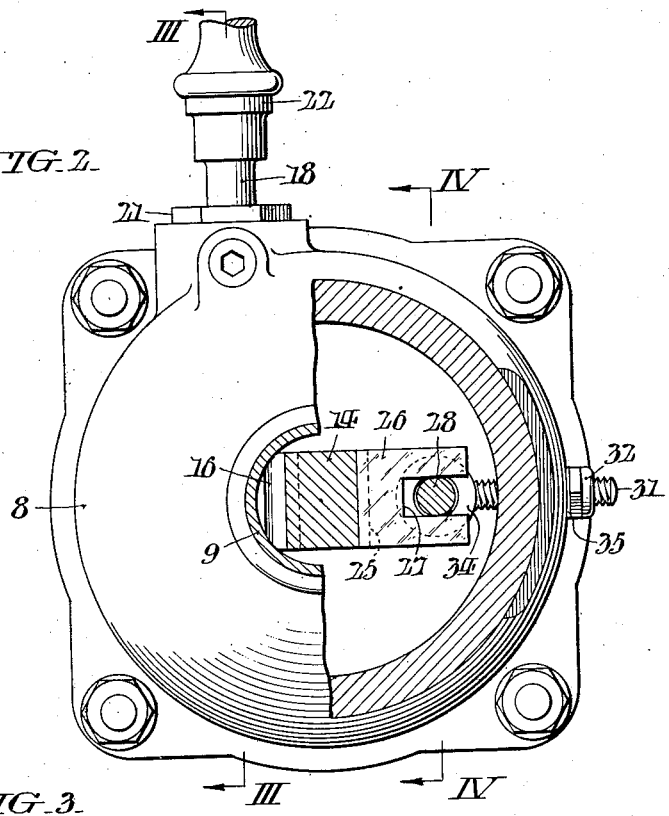
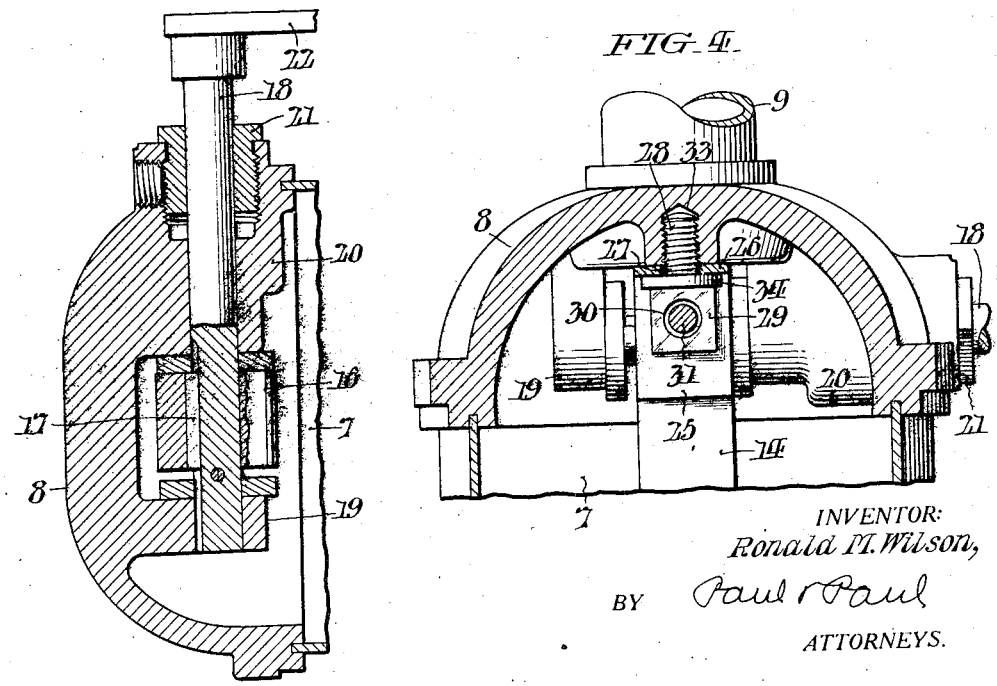
INVENTOR:
Ronald M. Wilson,
BY Paul & Paul
ATTORNEYS.

Patented Apr. 12, 1949

2,467,066

UNITED STATES PATENT OFFICE 2,467,066

ADJUSTABLE RACK SLIDE BEARING

Ronald M. Wilson, Ambler, Pa.

Application February 27, 1947, Serial No. 731,243

3 Claims. (Cl. 308—3)

This invention has general reference to bearings for slidable toothed racks that coact with gear means whereby such racks are moved, while it preferably relates to the species or form thereof useful in dispensing pumps, wherein the piston is raised by a rack and gear mechanism immersed in the liquid to be pumped. Heretofore mechanism of the type referred has involved the provision of a guide or bearing surface in the pump body, or had, on which the back of the rack is arranged for sliding movement, such bearing surface also serving to hold the teeth of the rack in operative mesh with the gear. Now, it is to be noted that inasmuch as the bearing for such mechanism is immersed in the liquid it is impossible to properly lubricate the relatively movable parts and, consequently, wear at their region of coaction is rather rapid with resultant development of improper operation. Again in the more common pump constructions the rack slide bearing is usually a negligibly finished surface in the pump housing, that is difficult of access. To overcome the inherent disadvantage of such construction recourse has been had to the use of a rack slide bearing capable of adjustment from the outside of the pump body or casing. This type of bearing is held in place by a sustaining-stud within the pump-head and engages through an angularly-related portion of the slide bearing, while the latter is held at the requisite adjustment by aid of a screw extended to the outside of the pump head; but it has been found that the sustaining stud occasionally works loose in service and drops down into the pump, thereby entailing unnecessary expenditure of time and labor in making the requisite replacement.

The primary object of this invention is to overcome the above noted disadvantages in a simple and effective manner.

Another object is to provide an improved form of rack slide bearing which can be easily adjusted with a minimum of effort and pre-assurance that said rack slide will be constrained at all times to direct action in respect to the operating gear or, that it will not become deflected from its proper tangential relation to said gear under all normal service conditions.

A still further object of this invention is the provision of a rack slide bearing which is very simple in construction, thoroughly reliable and effective in action, readily accessible for adjustment, and comparatively inexpensive to manufacture.

With the above stated objects and ancillary advantages in view this invention essentially consists in certain novel features and details of construction, as well as the arrangement of parts hereinafter fully disclosed, illustrated by the accompanying two sheets of drawings, and more particularly pointed out in the concluding claims.

In the drawings:

Fig. 1 is a broken sectional elevation of a known type of gasoline dispensing pump, preferably designed for use on farms, in other locations, and for servicing tractors, trucks and other motor driven agricultural implements or apparatus, ordinarily situated at considerable distances from regular oil stations, and the like.

Fig. 2, Sheet 2, is a plan section taken approximately as indicated by the staggered dot-and-dash line with associated arrows II—II in Fig. 1.

Fig. 3 is a horizontal section taken on the plane III—III of Fig. 2.

Fig. 4 is a broken vertical section on the plane IV—IV of Fig. 2.

Fig. 5, Sheet 1 is a perspective view of an eye-headed stud, hereinafter referred to in detail; and, Fig. 6 is a perspective view of the improved rack slide bearing component later on again referred to.

In the following detailed description of the embodiment of my invention shown by the accompanying sheets of drawings, specific terms will be employed for the sake of clarity, but it is to be understood that such terms are used in a descriptive sense and not for purposes of limitation.

Referring more in detail to the drawings, the reference character 7 designates a fragmentary portion of the body or cylindrical shell of a known type of liquid dispensing pump, the same being fitted with an inverted concave-convex head 8 having an attached pipe 9 in turn connecting into an elbow 10 for application thereto of a flexible hose 11, as well as a coupler-support 12 for the hose nozzle 13, all in accordance with known construction.

The toothed rack 14, to the lower end whereof the pump plunger—not shown—is attached at 15, meshes with a gear 16 keyed at 17 on a horizontal shaft 18 appropriately journaled in spaced bearings 19, 20 in the head 8 aforesaid. The bearing 20, for example, is provided with an appropriate packing-gland 21, and the shaft 18 has an attached or removable manipulator or crank arm 22, whereby the rack 14 is raised by rotation of the gear 16 in an obvious manner, or vice versa; while 23 designates an adjuster screw or stop device for limiting the upward movement of said rack 14 as predetermined by the setting of the device 23 and its securement by aid of a locknut 24.

Referring again to the toothed rack 14 the same is constrained to vertical reciprocation by aid of an angle-section guide member 25 the relatively horizontal flange 26 whereof is provided with a cut-out 27, which permits of its being laterally adjusted, as hereinafter explained. In addition use is made of a special form of retainer screw stud 28, Fig. 6, the same having a cubiform head 29 with a diametrically related aperture 30 therethrough of a diameter to permit free passage of the adjusting screw 31 that is fitted with a lock nut 32. The retainer-stud 28 is preferably threaded into the inner surface of the pump head 8 at 33 and it is conveniently provided with a washer 34; while a sealing washer 35 may be applied to the lock nut 32, for obvious reasons.

From the foregoing it will be readily seen that the rack slide bearing or guide member 25 is first laterally positioned so that the toothed rack 14 operatively meshes the gear 16 whereupon the retainer stud 28 is turned so that the hole 30 in the head 29 of said stud, is coplanarly related with respect to that of the rack, whereupon the adjusting screw 31 is forwardly driven, as by a suitable driver—not shown—applied to the cross cut 36 in its outer end, until the inner end of such screw abuts the confronting face of the guide member 25, when the lock-nut 32 is tightened up in an obvious manner. Now it can be clearly seen that the retainer stud 28 not only holds the guide bearing member 25 in place, while allowing it to be adjusted to compensate for wear, but it also effectively prevents the adjusting screw 31 from bending or getting out of alignment. Furthermore, by positioning the adjusting screw 31 through the hole 30 in the head 29 of the retainer stud 28, said stud is restrained from turning or accidentally working loose; whereas said adjusting screw 31 is capable of being driven against the bearing member 25 at a point near its center or where it is best suited to maintain smooth coaction therewith of the rack slide bearing 14.

Having thus described my invention, I claim:

1. In adjustable rack slide bearings, the combination with an angle-section guide member, of a retainer-stud having a head for holding the guide member in operative coaction with the rack, and an aperture across said head; a suitably mounted screw having passage through the stud head aperture with abutment at its inner end against the guide member; and means whereby said screw is locked at the necessary adjustment, whereby the guide member is retained in proper operative position and the retainer stud prevented from turning or becoming disconnected.

2. The invention of claim 1 wherein the retainer stud embodies a screw-threaded shank with a cubiform head, and said head has a cross-bore therethrough.

3. The invention of claim 1 wherein the screw is of the headless type and includes a lock-nut at its outer end; and wherein washers are applied to the inner face of the retainer stud head and the corresponding face of the adjustment screw locking means, for the respective purposes specified.

RONALD M. WILSON.

No references cited.